(12) United States Patent
Cambronero Sánchez et al.

(10) Patent No.: US 12,705,027 B2
(45) Date of Patent: Aug. 11, 2026

(54) CODE GENERATION SYSTEM USING PRE-TRAINED DIFFUSION MODEL

(71) Applicant: Microsoft Technology Licensing, LLC, Redmond, WA (US)

(72) Inventors: José Pablo Cambronero Sánchez, Washington, DC (US); Mukul Singh, Delhi (IN); Sumit Gulwani, Sammamish, WA (US); Vu Minh Le, Redmond, WA (US); Gust Verbruggen, Keerbergen (BE); Carina Negreanu, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 18/592,101

(22) Filed: Feb. 29, 2024

(65) Prior Publication Data

US 2025/0278249 A1 Sep. 4, 2025

(51) Int. Cl.
*G06F 8/30* (2018.01)

(52) U.S. Cl.
CPC .................................... *G06F 8/30* (2013.01)

(58) Field of Classification Search
CPC .................................... G06F 8/30; G06F 8/33
See application file for complete search history.

(56) References Cited

U.S. PATENT DOCUMENTS

2022/0035605 A1* 2/2022 Ibarra Von Borstel .................... G06N 3/047

OTHER PUBLICATIONS

Lin, Z., Gong, Y., Shen, Y., Wu, T., Fan, Z., Lin, C., . . . & Chen, W. (Jul. 2023). Text generation with diffusion language models: A pre-training approach with continuous paragraph denoise. In International Conference on Machine Learning (pp. 21051-21064). PMLR. (Year: 2023).*

Vaswani, A., Shazeer, N., Parmar, N., Uszkoreit, J., Jones, L., Gomez, A. N., . . . & Polosukhin, I. (2017). Attention is all you need. Advances in neural information processing systems, 30. (Year: 2017).*

(Continued)

*Primary Examiner* — Wei Y Mui
*Assistant Examiner* — Vivian Weijia Duan
(74) *Attorney, Agent, or Firm* — NovoTechIP International PLLC

(57) ABSTRACT

A code generating system is configured to receive a code description prompt which includes a natural language description of a code snippet for the code generating system to generate via a user interface. The system encodes the prompt to generate a code description embedding that embeds the natural language prompt into a continuous space using an encoder. A noisy code snippet embedding is then iteratively denoised conditioned on the code description embedding to generate a denoised code snippet embedding. The denoised code snippet embedding is decoded using a pre-trained decoder having full self-attention and cross-attention with the code snippet embedding to generate a final predicted code snippet embedding. The final predicted code snippet embedding is then projected to discrete code tokens using a classification head that computes a probability distribution over code tokens and selects code tokens for a predicted code snippet based on the probability distribution.

17 Claims, 9 Drawing Sheets

(56) References Cited

OTHER PUBLICATIONS

Li, X., Thickstun, J., Gulrajani, I., Liang, P. S., & Hashimoto, T. B. (2022). Diffusion-lm improves controllable text generation. Advances in neural information processing systems, 35, 4328-4343. (Year: 2022).*

Lewis, M., Liu, Y., Goyal, N., Ghazvininejad, M., Mohamed, A., Levy, O., . . . & Zettlemoyer, L. (Jul. 2020). BART: Denoising sequence-to-sequence pre-training for natural language generation, translation, and comprehension. (Year: 2020).*

Feng, Z. (2020). Codebert: A pre-trained model for program-ming and natural languages. arXiv preprint arXiv:2002.08155. (Year: 2020).*

* cited by examiner

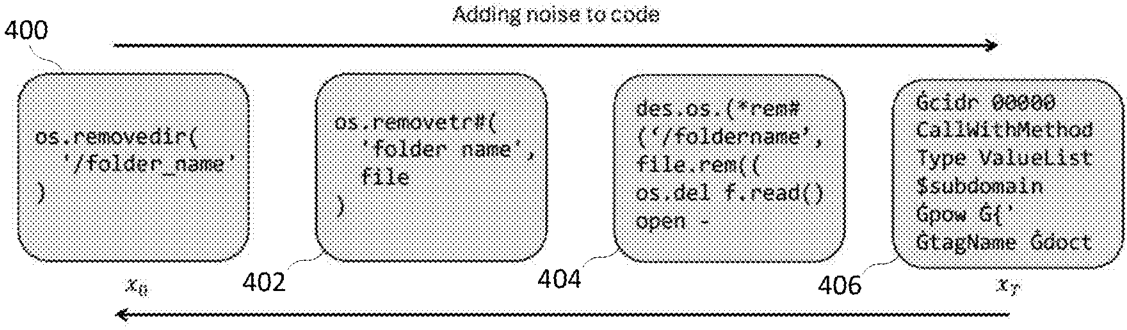

| | |
|---|---|
| NL: | Copy the content of file 'file.txt' to file 'file2.txt' |
| Target: | shutil.copy('file.txt', 'file2.txt') |
| t = 1200 | Ss ec between Useful 144 Location copyright pen they destinat Path caret corev adapter NameAnd Ġiterating Ġface Ġpass ĠFH |
| t = 1000 | (.* for copyInt filefiletxt, filefiletxt queryResult SE Screen |
| t = 800 | destutil..copyInt'filetxt', 'filetxt') return 'filetxt' |
| t = 600 | destutil.copyInt'file.txt', 'fi2.txt') |
| t = 400 | shutil.copyInt'file.txt', 'file.txt') |
| t = 200 | shutil.copy('file.txt', 'file2.txt') |
| t = 0 | shutil.copy('file.txt', 'file2.txt') |

| System description | | | Python (CodeBERT) | | | Bash (template) | | | CF Rule (execution) | | |
|---|---|---|---|---|---|---|---|---|---|---|---|
| System | Model | #P | top-1 | top-3 | top-5 | top-1 | top-3 | top-5 | top-1 | top-3 | top-5 |
| T5 | t5-large | 770M | 80.4 | 82.3 | 84.8 | 67.1 | 68.9 | 70.3 | 71.1 | 73.4 | 74.6 |
| CodeT5 | codet5-large | 770M | 80.5 | 83.1 | 85.0 | **67.6** | 69.3 | 70.5 | 72.7 | 75.3 | 75.8 |
| GPT-3 | text-davinci-003 | 175B | **82.5** | 83.7 | 85.8 | 66.9 | 67.7 | 68.4 | 70.3 | 72.4 | 72.8 |
| ChatGPT | gpt-3.5-turbo | Unknown | 80.6 | 82.5 | 83.9 | 66.1 | 66.9 | 67.8 | 70.8 | 73.1 | 74.5 |
| StarCoder | starcoder | 15.5B | 79.2 | 82.0 | 84.1 | 64.5 | 65.3 | 66.5 | 70.6 | 72.8 | 74.5 |
| CodeT5+ | codet5p-16b | 16B | 79.6 | 82.1 | 84.5 | 65.7 | 66.1 | 67.2 | 70.5 | 72.9 | 74.3 |
| CodeGen | codegen-350m | 350M | 80.1 | 81.8 | 83.7 | 67.2 | 69.2 | 70.3 | 71.4 | 73.7 | 75.0 |
| Diffusion-LM | Custom | 50M | 70.4 | 74.3 | 76.5 | 59.4 | 61.6 | 62.0 | 62.4 | 65.5 | 68.2 |
| GENIE | Custom | 93M | 73.2 | 77.1 | 80.3 | 60.0 | 61.5 | 62.3 | 62.9 | 66.8 | 68.7 |
| CODEFUSION | **Custom** | 75M | 80.7 | **86.3** | **90.3** | 66.7 | **70.2** | **72.0** | **72.8** | **76.7** | **78.5** |

FIG. 7

| Models | N-grams (↑ better) | | | | Embedding similarity (↓ better) | | | Edit distance (↑ better) | | |
|---|---|---|---|---|---|---|---|---|---|---|
| | 1 | 2 | 3 | 4 | Min | Max | Mean | Min | Max | Mean |
| T5 | 0.29 | 0.45 | 0.54 | 0.6 | 0.93 | 0.99 | 0.97 | 0.08 | 0.58 | 0.36 |
| CodeT5 | 0.27 | 0.41 | 0.46 | 0.51 | 0.94 | 0.99 | 0.97 | 0.08 | 0.56 | 0.32 |
| GPT-3 | 0.24 | 0.36 | 0.42 | 0.48 | 0.97 | 0.99 | 0.99 | 0.00 | 0.28 | 0.21 |
| StarCoder | 0.32 | 0.48 | 0.56 | 0.61 | 0.89 | 0.98 | 0.96 | 0.11 | 0.61 | 0.39 |
| CodeGen | 0.28 | 0.41 | 0.49 | 0.55 | 0.94 | 0.99 | 0.97 | 0.09 | 0.52 | 0.34 |
| CODEFUSION | **0.53** | **0.65** | **0.74** | **0.81** | **0.83** | **0.97** | **0.91** | **0.21** | **0.83** | **0.57** |

FIG. 8

| System | Python | Bash | CF Rules |
|---|---|---|---|
| Diffusion-LM | 19.5 | 40.4 | 74.3 |
| GENIE | 24.2 | 54.2 | 78.6 |
| CODEFUSION | **67.6** | **73.4** | **94.5** |

FIG. 9

CODE GENERATION SYSTEM USING PRE-TRAINED DIFFUSION MODEL

BACKGROUND

Current autoregressive code generation tools based on the transformer architecture are capable of generating high quality code in response to natural language inputs. However, these tools have limitations in that they are generally not capable of reconsidering tokens generated earlier in the process. As a result, autoregressive code generation can suffer from low diversity of code generations which in turn can hinder the widespread acceptance and adoption of these techniques for code generation.

Diffusion models, which have typically been used in image generation tasks, have recently been extended to generate diverse text. A diffusion model for text generation is a generative model trained to reverse a stochastic process of adding noise to data. For text generation, an encoder transforms input text to a sequence of input embeddings which is provided to the diffusion model. The diffusion model then iteratively denoises random Gaussian noise conditioned on the input embeddings to generate a sequence of denoised output embeddings. Typically, each denoised output embedding is then mapped to discrete text by selecting the vocabulary token with the closest embedding to the denoised embedding. While capable of diverse code generations, diffusion models have difficulty in generating syntactically correct code because, in the code domain, there are many syntactic and semantic constraints between tokens which frequently cause errors in the mapping of denoised output embeddings to tokens and result in invalid code generations.

Due to the limitations of current AI code generation tools, developers who wish to utilize such tools must typically choose between high quality (using traditional autoregressive architectures) and high diversity (using a diffusion architecture) for the code generations. Hence, what is needed is an AI-based code generation architecture that does not suffer from the limitations of prior art and that enables a balance between diversity and quality of code generations.

SUMMARY

In one general aspect, the instant disclosure presents a code generating system having a processor and a memory in communication with the processor wherein the memory stores executable instructions that, when executed by the processor alone or in combination with other processors, cause the code generating system to perform multiple functions. The function may include receiving a code description prompt which includes a natural language description of a code snippet for the code generating system to generate via a user interface; encoding the natural language prompt to generate a code description embedding that embeds the natural language prompt into a continuous space using an encoder; iteratively denoising a noisy code snippet embedding conditioned on the code description embedding using a pre-trained denoiser to generate a denoised code snippet embedding; decoding the denoised code snippet embedding using a pre-trained decoder having full self-attention and cross-attention with the code snippet embedding to generate a final predicted code snippet embedding; projecting the final predicted code snippet embedding to discrete code tokens using a classification head that computes a probability distribution over code tokens and selects code tokens for a predicted code snippet in a target programming language based on the probability distribution; and returning the predicted code snippet to the user interface.

In yet another general aspect, the instant disclosure presents a method for generating code using a code generating system. The method includes encoding using an encoder a natural language prompt to generate a code description embedding that embeds the natural language prompt into a continuous space; iteratively denoising a noisy code snippet embedding conditioned on the code description embedding using a pre-trained denoiser to generate a denoised code snippet embedding; decoding the denoised code snippet embedding using a pre-trained decoder having full self-attention and cross-attention with the code snippet embedding to generate a final predicted code snippet embedding; projecting the final predicted code snippet embedding to discrete code tokens using a classification head that computes a probability distribution over code tokens and selects code tokens for a predicted code snippet in a target programming language based on the probability distribution; and returning the predicted code snippet to a user interface.

In a further general aspect, the instant application describes a non-transitory computer readable medium on which are stored instructions that when executed cause a programmable device to perform functions of receiving a code description prompt which includes a natural language description of a code snippet for the code generating system to generate via a user interface; encoding the natural language prompt to generate a code description embedding that embeds the natural language prompt into a continuous space using an encoder; iteratively denoising a noisy code snippet embedding conditioned on the code description embedding using a pre-trained denoiser to generate a denoised code snippet embedding; decoding the denoised code snippet embedding using a pre-trained decoder having full self-attention and cross-attention with the code snippet embedding to generate a final predicted code snippet embedding; projecting the final predicted code snippet embedding to discrete code tokens using a classification head that computes a probability distribution over code tokens and selects code tokens for a predicted code snippet in a target programming language based on the probability distribution; and returning the predicted code snippet to the user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4 and 5 illustrate how noise can be added to and removed from code-based text.

FIG. 7 depicts a table which compares the performance of the code generating system of this disclosure with baselines on the task of natural language to code generation for Python, Bash and CF rules.

FIG. 8 depicts a table which compares the diversity in top-5 code generations for the code generating system of this disclosure with baselines for Python, Bash and CF rules.

FIG. 9 depicts a table which shows the percent of top-1 generations that are syntactically valid for the code generating system of this disclosure and text diffusion-based baselines.

DETAILED DESCRIPTION

Figure 1:
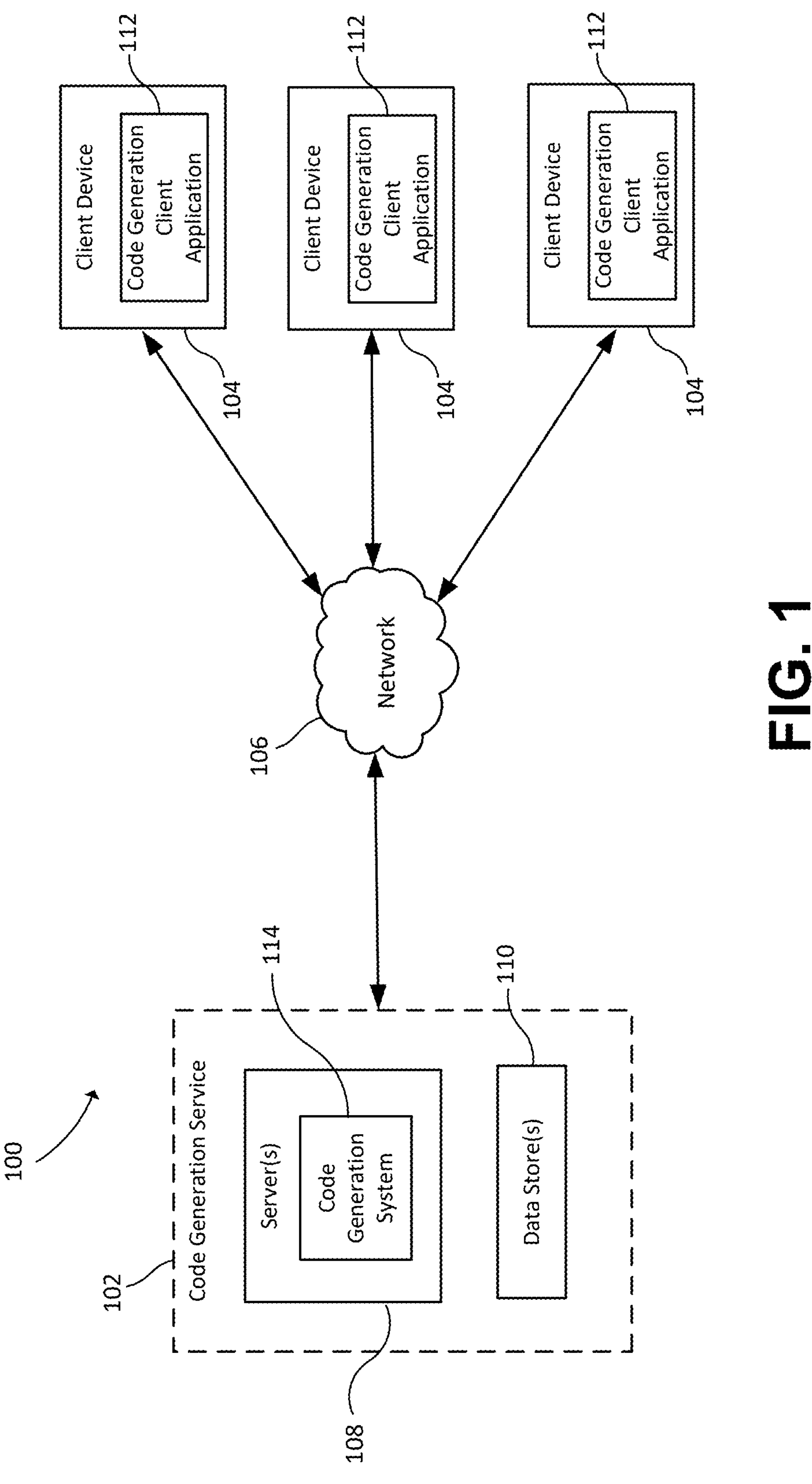
FIG. 1 is a diagram showing an example computing environment in which aspects of the disclosure may be implemented.

Natural language (NL)-to-code artificial intelligence (AI) models are being developed that enable program code to be generated from natural language inputs. Instead of writing code themselves line by line, developers can enter a text prompt that describes what the code should do in plain language, and the NL-to-code AI model automatically generates the code. NL-to-code AI models are frequently implemented using generative transformer-based models, such as Generative Pre-Trained Transformer (GPT) based Large Language Models (LLMs). Transformer-based NL-to-code models are typically autoregressive and have an encoder-decoder or decoder-only architecture. The encoder processes the input text and generates a sequence of hidden states (also referred to as embeddings, vectors, and the like) which is provided to the decoder as input. The decoder then processes the sequence of hidden states to generate a sequence of output tokens which corresponds to the code generated based on the natural language input. These models typically generate the output sequence autoregressively meaning that the output sequence is generated one token at a time by predicting the next token in the output sequence based on the input (i.e., the sequence of hidden states) and any previously generated tokens.

While capable of producing high quality results, previously known autoregressive code generation models have limitations which can hinder widespread adoption of these models for code generation tasks. For example, autoregressive transformer models are generally not capable of reconsidering tokens generated earlier in the process which leads to low diversity in code generations. Diversity refers to the ability of a model to generate different outputs based on the same input. Because autoregressive models do not account for prior generations, they tend to generate the same or similar outputs in response to the same input. Having low diversity of outputs can adversely impact user satisfaction with the performance of the model and may not be acceptable to many users. Furthermore, most previously known autoregressive models which have been used to generate code have a large size (e.g., 350M-175B parameters) and thus require a significant amount of computing resources which makes these models difficult to implement.

Diffusion models, which have shown remarkable performance in image generation tasks, have recently been extended to generate diverse text. Therefore, efforts have been made to combine diffusion with a transformer-based architecture to enable more diverse NL-to-code generations. One such approach involves using a transformer-based encoder to convert an input sequence of code tokens to a sequence of embeddings which is provided as input to a diffusion model. The diffusion model performs a learnt denoising process that involves iteratively denoising a random Gaussian noise conditioned on the input sequence to generate a sequence of denoised output embeddings. Typically, each denoised output embedding is then mapped to discrete text by selecting the vocabulary token with the closest embedding to the denoised embedding. While capable of diverse text generations, diffusion models have difficulty in generating syntactically correct code because, in the code domain, there are many syntactic and semantic constraints between tokens. Diffusion processes (e.g., denoising) by nature are generally not capable of taking syntactic and semantic constraints into consideration while iteratively denoising embeddings. As a result, the use of diffusion in code generation frequently results in code generations with syntax and semantic errors.

To address these technical problems and more, in an example, this description provides technical solutions in the form of a code generating system, referred to as CodeFusion, that combines an encoder-decoder architecture with a diffusion process. The encoder maps the natural language code description into a continuous representation, also referred to as a vector representation, and a code description embedding, in a continuous embedding space. The diffusion process involves using a denoiser to iteratively denoise a noisy (e.g., Gaussian noise) code snippet embedding conditioned on the code description embedding to generate a predicted denoised code snippet embedding. To generate syntactically correct code, the predicted denoised code snippet embedding is fed to a transformer decoder, with full self-attention and cross attention with the code description embedding, to generate a final predicted code snippet embedding. Because the decoder has full self-attention, each dimension of the final predicted code snippet embedding to be generated by taking into consideration all of the other dimensions of the final predicted code snippet embedding. The final predicted code snippet embedding is then provided to a classifier head which computes a probability distribution over code tokens and selects code tokens for a predicted code snippet in a target programming language based on the probability distribution. The predicted code snippet is then returned to a user interface and presented to the user which generated the initial prompt.

To pre-train the diffusion model for code generation, a continuous paragraph denoising (CPD) process used in text generation tasks is applied to the code domain. The CPD process involves applying noise only to tokens that correspond to identifiers in code or to built-in keywords in the target coding language. Denoising these tokens allows the model to learn relations between critical code tokens (like variable names, function names and control flow built-ins). As a result, the CPD process biases the model towards learning to remove noise in a context-aware fashion. The use of the CPD process paired with a decoder that has access to the full denoised representation enables the NL-to-code model to generate diverse and syntactically correct code on par with or better than (much larger) auto-regressive models.

FIG. 1 shows an example computing environment 100 in which aspects of the disclosure may be implemented. The computing environment 100 includes a code generation service 102 and client devices 104 which communicate with each other via a network 106. The network 106 includes one or more wired, wireless, and/or a combination of wired and wireless networks. In some implementations, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate. In some examples, the network 106 is coupled to or includes portions of a telecommunications network for sending data in a variety of different communication protocols. In some implementations, the network 106 includes Bluetooth® communication networks or a cellular communications network for sending and receiving data including via short messaging service (SMS), multimedia messaging service (MMS), hypertext transfer protocol (HTTP), direct data connection, WAP, email, and the like.

The code generation service 102 may be implemented as a cloud-based service or set of services. To this end, code generation service 102 is executed on or includes at least one server 108 which is configured to provide computational and/or storage resources for implementing the code generation service 102. The server 108 is representative of any physical or virtual computing system, device, or collection thereof, such as, a web server, rack server, blade server, virtual machine server, or tower server, as well as any other type of computing system used to implement the code generation service 102. Servers are implemented using any suitable number and type of physical and/or virtual computing resources (e.g., standalone computing devices, blade servers, virtual machines, etc.). Code generation service 102 may also include one or more data stores 110 for storing data, programs, and the like for implementing and managing the code generation service 102. In FIG. 1, one server 108 and one data store 110 are shown, although any suitable number of servers and/or data stores may be utilized.

Client devices 104 enable users to access the services provided by the code generation service 102 via the network 106. Client devices 104 can be any suitable type of computing device, such as personal computers, desktop computers, laptop computers, smart phones, tablets, gaming consoles, smart televisions and the like. Client devices 104 include at least one code generation client application 112 that is configured to interact with the code generation service 102. Examples of code generation client applications include text editors, code editors, word processing programs, integrated development environments (IDEs), and the like. In various implementations, client application 112 is a dedicated application installed on the client device and programmed to interact with one or more services provided by cloud infrastructure. In some implementations, client application 112 is an add-on, extension, or the like that can be integrated into other applications to enable interaction with the code generation service 102. In some cases, client application 112 is a general-purpose application, such as a web browser, configured to access services and/or applications over the network 106.

The code generation service 102 includes a code generation system 114, also referred to herein as CodeFusion, for providing code generation services to clients. In accordance with this disclosure, the code generation system 114 includes a NL-to-code model that combines an encoder-decoder architecture with a pre-trained diffusion model that is capable of syntactically correct code at high rates and with high diversity.

Figure 2:
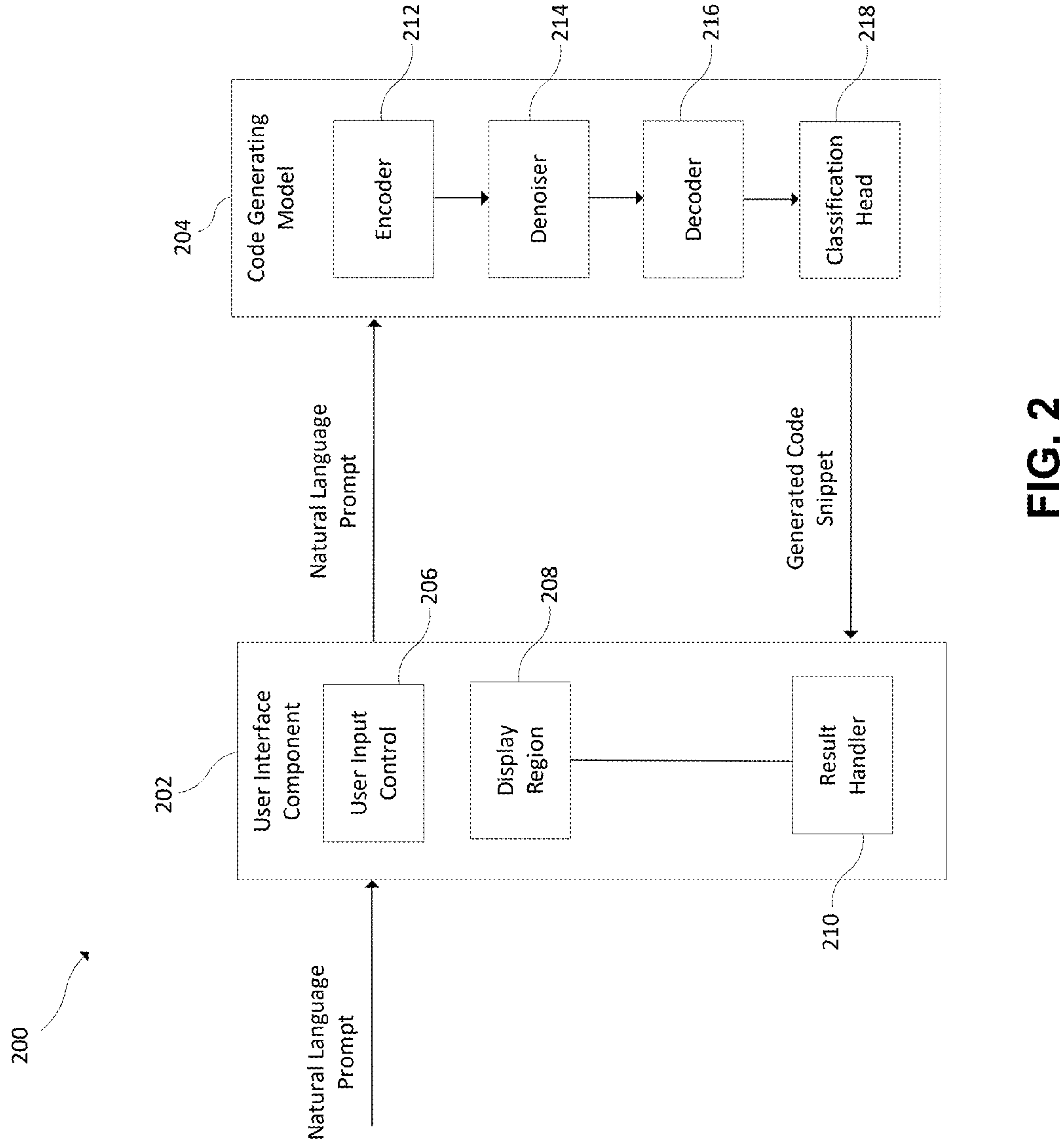
FIG. 2 depicts an example implementation of a code generation system which may be implemented in a computing environment, such as the computing environment of FIG. 1.

An example implementation of a code generation system 200 is shown in FIG. 2. The code generation system 200 includes a user interface (UI) component 202 and a code generating model 204. The UI component 202 is a software program executed on a computing device, such as a client device, which enables a user to connect to and interact with the code generation system. The UI component 202 includes at least one user input control 206, such as a text field, for receiving user input in the form of a natural language prompt for the code generation system. User input may be provided via a user input device, such as a keyboard, touch input, voice input, and the like. The natural language prompt includes a description of the functionality for a code snippet (e.g., program, function, code block, or the like) that a user wants to have generated by the system.

The UI component 202 also includes a display region 208 for displaying the output and responses returned by the code generation system and a result handler 210 which receives the output of the code generation service that is generated in response to a prompt and causes the output to be displayed in the display region 208. The UI component 202 is configured to communicate natural language prompts to the code generating model 204.

The code generating model 204 includes an encoder 212, a denoiser 214, a decoder 216, and a classification head 218. The encoder 212 transforms the natural language prompt into a code description embedding which maps the natural language of the prompt to a continuous space. The denoiser 214 is trained to perform an iterative denoising process on a noisy code snippet embedding conditioned on the code description embedding to generate a predicted denoised code snippet embedding. The encoder 212 is designed to determine a final hidden representation, also referred to as a final predicted code snippet embedding, by applying cross-attention between the input to the decoder and the output of the encoder 212 and full attention full self-attention over the input to the decoder 216. The final predicted code snippet embedding is then projected to discrete code tokens by the classification head 218. In various implementations, the classification head computes a probability distribution over code tokens, and selects code tokens with the highest probability for a predicted code snippet. The predicted code snippet is then returned to the result handler 210 of the user interface component 202 which causes the generated code snippet to be displayed in the display region 208.

Figure 3:
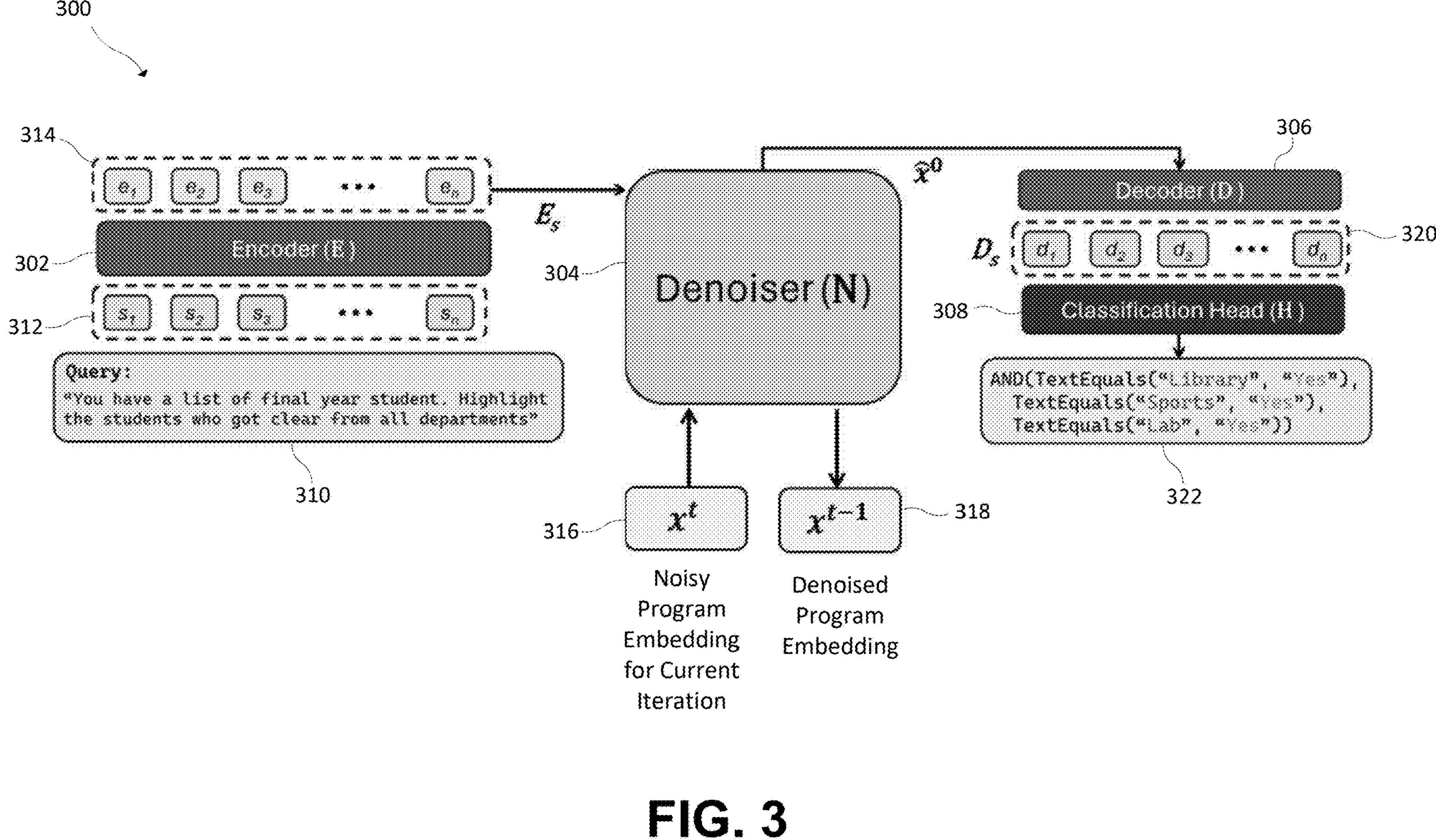
FIG. 3 depicts an example implementation of a code generating model for a code generating system, such as the code generating system of FIG. 2.

A more detailed depiction of an example implementation of a code generating model 300 is shown in FIG. 3. The code generating model 300 receives a natural language prompt 310 as input and generates a predicted code snippet 322 as output. For the purposes of this disclosure, the natural language input 310 is represented as a sequence s where $s=\{s_1, s_2, \ldots s_k\}$, and the predicted code snippet 322 is represented using the notation $\hat{y}=\{\hat{y}_1, \hat{y}_2, \ldots \hat{y}_s\}$, where $\hat{y}$ stands for the predicted code snippet and $\hat{y}_i$ stands for the discrete words/symbols in the predicted code snippet.

The code generating model 300 includes an encoder 302, a denoiser 304, a decoder 306, and a classification head 308. The encoder 302 tokenizes the natural language prompt s and transforms the tokenized prompt into a code description embedding 314, also referred to as a vector representation and continuous representation, that maps the natural language to a continuous embedding space. The code description embedding 314 is represented using the notation $E_s=E(s)=\{e_1, e_2, \ldots e_n\}$. The encoder 302 is trained to transform the tokenized prompt to the code description representation $E_s$ using an encoding function which is learned during pre-training of the encoder 302.

The denoiser 304 is a transformer-based model which has been trained to perform an iterative denoising process on an initial noisy code snippet embedding ($x^t$) 316 to generate a predicted denoised program embedding $\hat{x}^0$. As used herein, the phrase "code snippet embedding" refers to an embedding which is representative of an entire program or code snippet. The initial noisy code snippet embedding $x^t$ is used as the starting point for the denoising process. The denoiser 304 is trained to predict the noise which has been added to the initial noisy code snippet embedding $x^t$ that, when subtracted, will result in a predicted denoised code snippet embedding 318 that satisfies the conditions set by the code description embedding $E_s$. The denoiser 304 then generates the denoised code snippet embedding by subtracting the predicted noise from the noisy code snippet embedding. In other words, the denoiser 304 predicts and removes noise $\epsilon_t$ from the noisy code snippet embedding $x^t$ conditioned on the code description embedding $E_s$ and the time t to obtain the predicted denoised embedding $\hat{x}^0$. In this case, the predicted denoised embedding $\hat{x}^0=N(x^t, t, E_s)$, where N is a transformer block with cross-attention between $x^t$ and $E_s$ and full self-attention over $x^t$.

Before projecting the predicted denoised program embedding $\hat{x}^0$ back to discrete code tokens, the decoder 306 is used to process the predicted denoised code snippet embedding $\hat{x}^0$ to generate a final hidden representation 320, also referred to herein as a final predicted code snippet embedding, which is represented by the notation $D_s=\{d_1, d_2, \ldots d_n\}=D(x^0, E_s)$. The decoder 306 is designed with cross-attention between the predicted denoised code snippet embedding $\hat{x}^0$ and the code description embedding $E_s$ and with full self-attention over $\hat{x}^0$ which enables each hidden dimension ($d_i$) of the final predicted code snippet embedding to be generated with full information about the other dimensions. This is in contrast to prior text diffusion approaches, where tokens are generated independently without information pertaining to the other tokens. The final predicted code snippet embedding $D_s$ is then projected to discrete output code tokens by the classification head 308. The classification head 308 computes a probability distribution over all code tokens $p(y|d_i)$. The code token with the highest probability for each index i in the final hidden representation is selected for the predicted code snippet 322 based on the formula $\hat{y}=\arg\max_y p(y|d_i)$ for each index i, where $\hat{y}$ represents the predicted code snippet 322.

The code generation system is trained in two phases: unsupervised pre-training of the denoiser and decoder on code snippets, and supervised fine-tuning of encoder, denoiser and decoder on (natural language prompt, output code snippet). A trainable embedding layer L is used to embed a code snippet y into a continuous space where noise $\epsilon_t$ can be added and removed at timestep t. The loss function utilizes the hidden representation $D_s$ from the decoder. At time step t, the loss is computed as:

$$\mathcal{L}_t = \|\hat{\epsilon}_t - \epsilon_t\| + \|D_s - L(y)\| - \log p(y \mid d_i)$$

and consists of three parts. Training the denoiser involves minimizing the error between the predicted noise $\hat{\epsilon}_t$ and the actual noise $\epsilon_t$. Training the decoder involves minimizing the error between the output of the decoder $D_s$ and the embedded code L(y). The classification head is trained by applying a standard cross-entropy loss over the outputs of the classification head, which produces predicted code tokens given $D_s$, and the ground truth code snippet y. The phrase "ground truth" as it pertains to the output code snippet means the correct or target output or code snippet.

The loss function enables the three main components of the model (i.e., denoiser, decoder and classification head) to be trained with a diffusion objective. To pre-train the denoiser (N) and decoder (D) over a corpus of code snippets, two tasks are used: (1) unsupervised code generation and (2) continuous paragraph denoising (CPD) applied to code. This code-specific CPD task only masks tokens associated with identifiers or built-in keywords from the target coding language. These two tasks are randomly sampled during pre-training. Both pre-training and fine-tuning tasks use $\mathcal{L}_t$. Because there is no natural language prompt in pre-training, there is no input $E_s$ to the denoiser. In the unsupervised code generation task, $E_s$ is replaced with Gaussian noise sampled at every denoising time step. In the CPD task, $E_s$ is computed by passing the masked code y through encoder E.

The encoder, denoiser, and decoder can be instantiated using any suitable type of transformer-based model. In an example implementation, the encoder is instantiated as a CodeT5 encoder having an embedding dimension of 512, the denoiser is instantiated as a 10-layer transformer block, the decoder is instantiated with 6 transformer decoder layers, and the classification head is instantiated as a single fully connected layer. In the training and pre-training phase, a square root noise schedule with 1200 diffusion steps may be used. The tokenizer and vocabulary from CodeT5 are used with a target code length of 128 tokens, and the denoiser and decoder are pre-trained using code snippets only.

FIGS. 4 and 5 show examples of how noise can be incrementally added to and removed from text/code-based inputs. The process of iteratively adding noise to an initial correct code snippet is shown by viewing the blocks 400, 402, 404, 406 from left to right, and the process of iteratively denoising an initially noisy code snippet to generate a target code snippet is shown by viewing the blocks 400, 402, 404, 406 from right to left. In this case, noise refers to the addition, removal, and/or replacement of characters in various places within a code snippet. The block 400 on the left shows a correct code snippet $x_0$ which can be the starting point for incrementally adding noise to a code snippet or the ending point of an iterative denoising process after noise has been removed from the code snippet in block 402. Similarly, block 402 shows a code snippet that could result from adding noise to the code snippet of block 400 or removing noise from the code snippet of block 404. Block 404 shows a code snippet that could result from adding noise to the code snippet of block 402 or removing noise from the code snippet of block 406. Finally, block 406 shows a pure noise code snippet $x^T$ which could result from adding noise to the code snippet of block 404 or could be an initial noisy code snippet which is iteratively denoised to generate a target code snippet, such as code snippet $x_0$.

FIG. 5 schematically depicts the output of the decoder of the code generation model, which is a denoising process where denoising occurs at timesteps 1200, 1000, 800, 600, 400, 200, and 0. The denoising process starts with an initial noisy program embedding 500 as seen at timestep t=1200 and is conditioned by the natural language prompt 502. The denoised program embedding 504 that results from denoising the initial program embedding 500 at timestep t=1000 begins to more closely resemble a target code snippet which is capable of performing the function described by the prompt. The same is true for the denoising steps that occur at timestamps t=800, 600, 400, and 200. The output of the last iteration at timestep t=0 is the final predicted code snippet 506.

Figure 6:
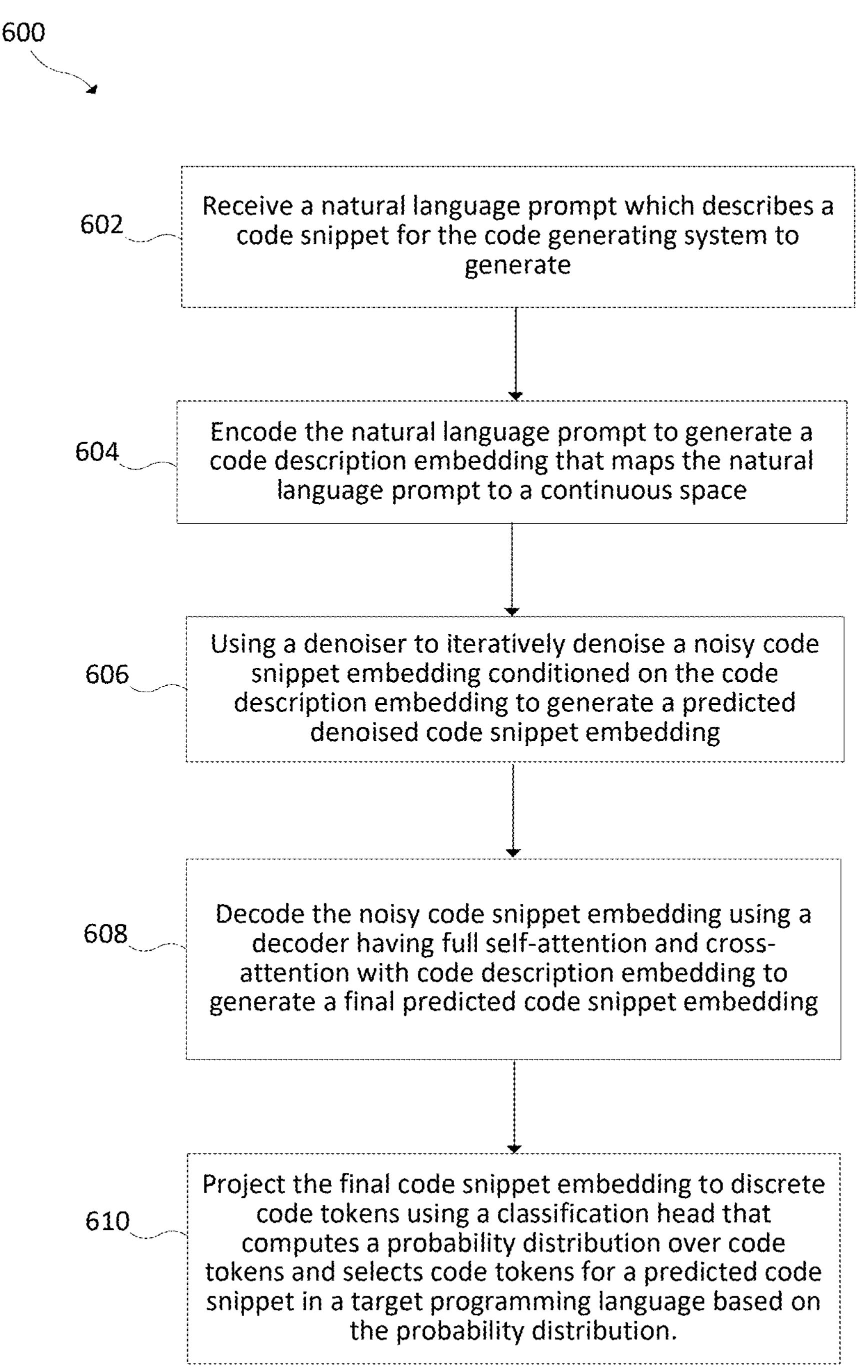
FIG. 6 is a flowchart of a method of generating code using the code generating system of this disclosure.

A flowchart for an example method 600 of generating code using a code generating system according to this disclosure is shown in FIG. 6. The method begins with receiving a natural language prompt which describes a code snippet for the code generating system to generate (block 602). An encoder encodes the natural language prompt to generate a code description embedding which maps the natural language prompt to a continuous embedding space (block 604). A denoiser is then used to iteratively denoise a noisy code snippet embedding conditioned on the code description embedding to generate a predicted denoised code snippet embedding (block 606). A decoder having full self-attention and cross-attention with the code description embedding is then used to decode the predicted denoised code snippet embedding to generate a final predicted code snippet embedding (block 608). The final predicted code snippet is then projected to discrete code tokens using a classification head that computes a probability distribution over code tokens and selects code tokens for a predicted code snippet in a target programming language based on the probability distribution (block 610).

The code generation system was evaluated on NL-to-code for languages with varying complexity: Python, Bash, and conditional formatting (CF) rules in Excel. The CoNaLa dataset for Python consists of complex, multi-statement StackOverflow code snippets and associated NL questions. The Bash dataset has complex, single-line Bash commands annotated with NL descriptions. The CF dataset consists of Excel CF rules, which are single line programs of low complexity, annotated with NL.

The encoder, denoiser, and decoder can be instantiated using any suitable type of transformer-based model. For evaluation, the encoder was instantiated as a CodeT5 encoder having an embedding dimension of 512, the denoiser was instantiated as a 10-layer transformer block, the decoder was instantiated with 6 transformer decoder layers, and the classification head was instantiated as a single fully connected layer. In the training and pre-training phase, a square root noise schedule with 1200 diffusion steps was used. The tokenizer and vocabulary from CodeT5 were used with a target code length of 128 tokens, and the denoiser and decoder were pre-trained using code snippets only.

A combination of transformer and text diffusion models were used as baselines for the evaluation. These transformer and text diffusion models include: T5, GPT-3, ChatGPT, CodeT5, StarCoder, CodeT5+, CodeGen, Diffusion-LM, and Genie. Bash generation performance was evaluated using the template match metric which performs some basic normalization provided with the dataset. Python was evaluated using CodeBERTScore which has been shown to be a high-quality non-execution-based code matching metric. CF was evaluated using execution match by executing a rule on the data column and comparting to the expected output. To evaluate generation diversity, the following metrics were measured: (1) the count of distinct token n-grams in the generated code divided by number of tokens, 2) summary statistics over pairwise similarities of CodeBERT encodings, and (3) summary statistics over pairwise strong edit distances. evaluate CF using execution match. The evaluation involved asking the following questions: Q1. Does the code generating system generate correct and diverse code? Q2. How do different design decision impact performance? and Q3. How does the latent representation evolve during the diffusion steps?

FIG. 7 shows a table which summarizes performance in top-1, top-3 and top-5 settings for the code generating system (listed as CodeFusion in the tables of FIGS. 6-8) and baselines. In top-1, the code generating system of the instant disclosure For Python, only GPT-3 (175B) performed better than the code generating system (75M). In top-3 and top-5, the code generating system of the instant disclosure outperforms all baselines, consistent with previous observations that auto-regressive models with high top-1 performance sacrifice diversity in their generations.

FIG. 8 depicts a table which shows diversity results averaged across all benchmark tasks, over the top-5 generations for each model including the code generating system (e.g., CodeFusion), for model and auto-regressive (e.g., T5, CodeT5, StarCoder, CodeGen, GPT-3) baselines. The code generating system produces generations of higher diversity compared to auto-regressive models. Other diffusion methods (e.g., Diffusion-LM and GENIE) improve for top-3 and top-5 relative to top-1, but they fall short of the performance of the code generating system as a result of generating syntactically invalid programs. FIG. 9 depicts a table which shows the fraction of syntactically valid generations for the code generating system and diffusion baselines. Code generations are more often syntactically valid for the code generating system compared to diffusion models not designed for code, e.g., 33.8% more versus Diffusion-LM and 26.2% more versus GENIE averaged across all three languages.

Figure 10:
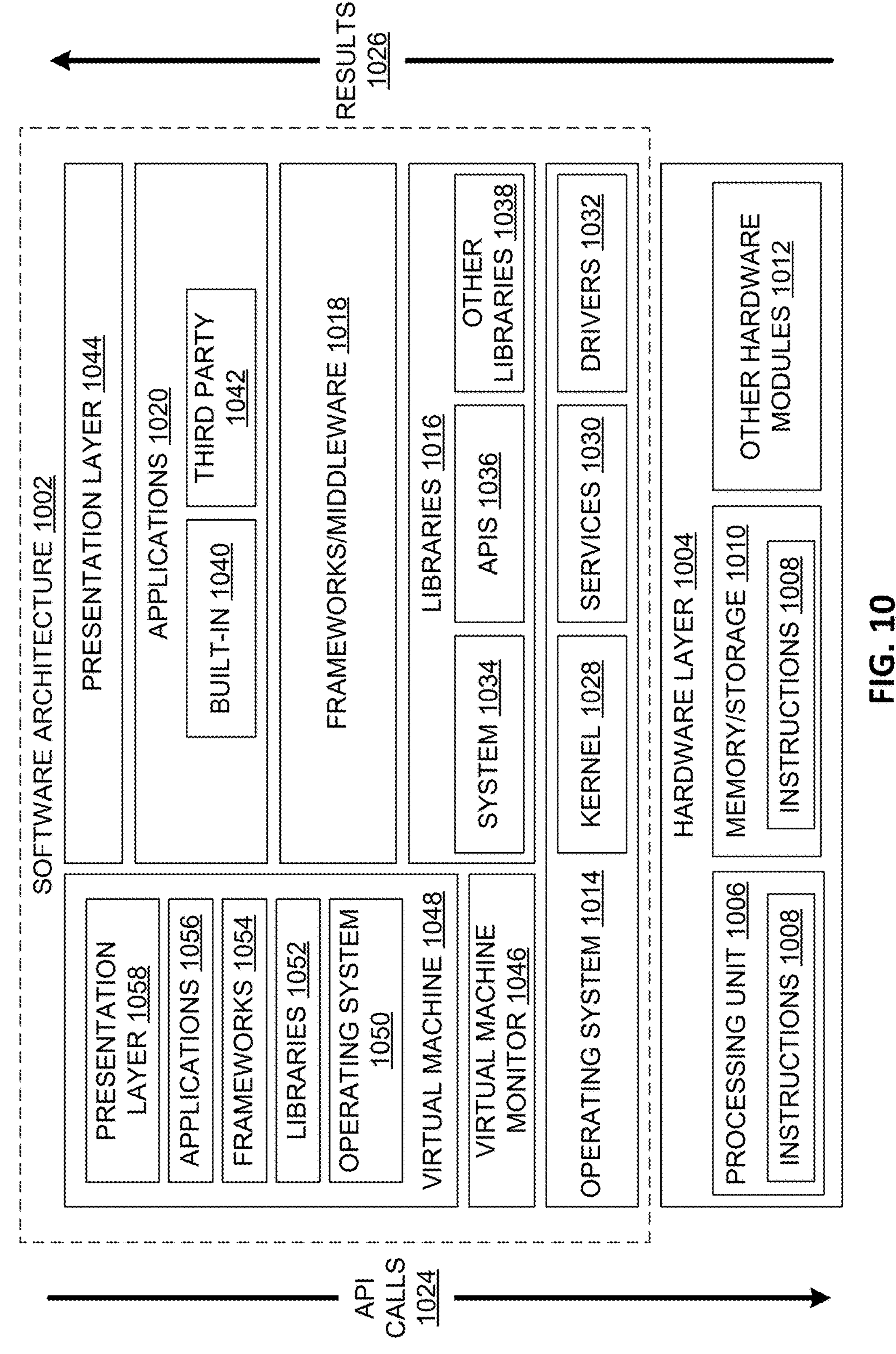
FIG. 10 is a block diagram showing an example software architecture, various portions of which may be used in conjunction with various hardware architectures herein described, which may implement any of the described features.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture, and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
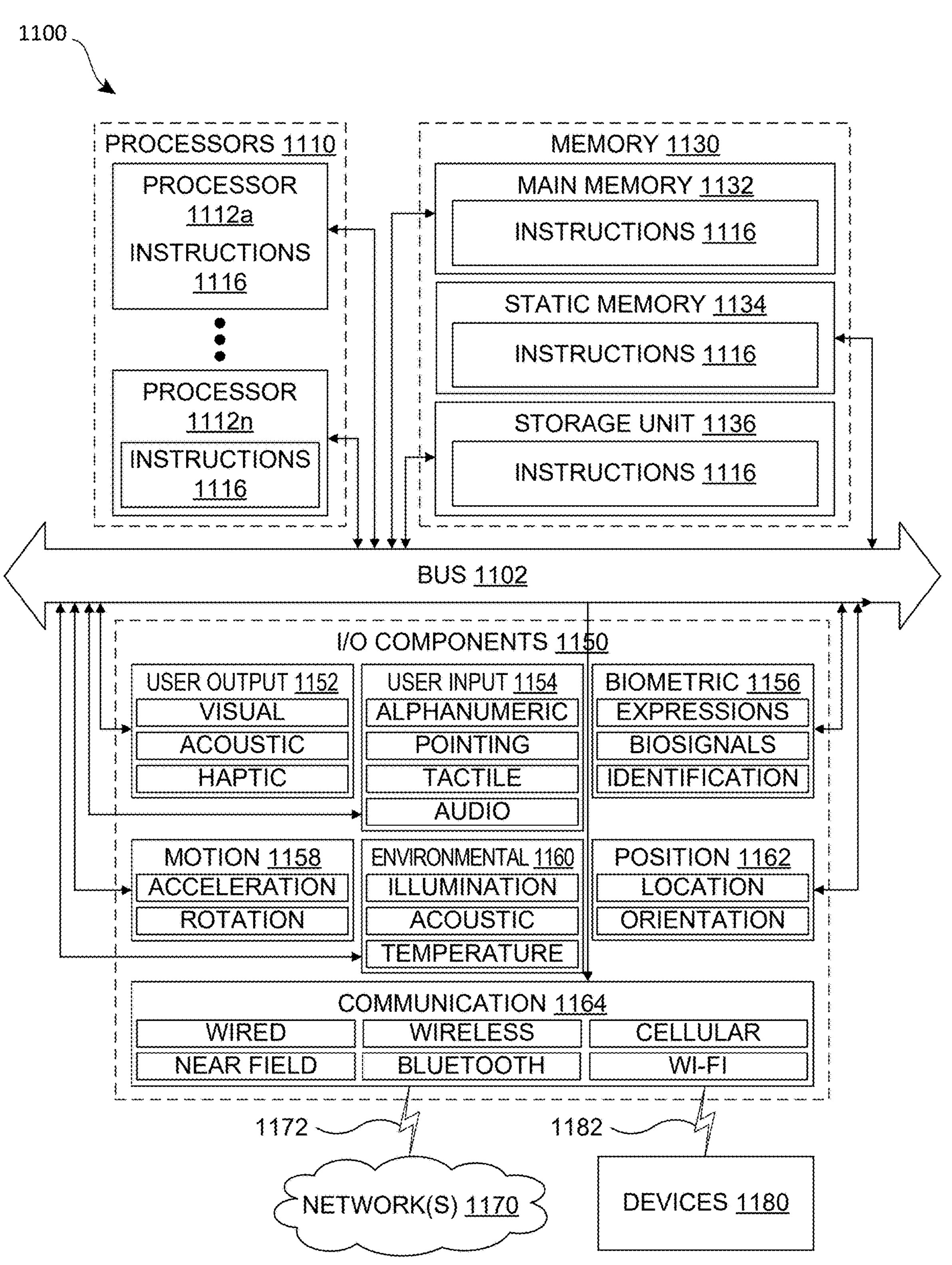
FIG. 11 is a block diagram showing components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term “machine” includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors **1112*a* to 1112*n* that may execute the instructions 1116 and process data. In some examples, one or more processors 1110 may execute instructions provided or identified by one or more other processors 1110. The term “processor” includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100** may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1164, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A code generating system comprising:

a processor; and a memory in communication with the processor, the memory storing executable instructions that, when executed by the processor alone or in combination with other processors, cause the code generating system to perform functions of:

receiving a code description prompt which includes a natural language description of a code snippet for the code generating system to generate via a user interface;

encoding the natural language prompt to generate a code description embedding that embeds the natural language prompt into a continuous space using an encoder;

iteratively denoising a noisy code snippet embedding conditioned on the code description embedding using a pre-trained denoiser to generate a denoised code snippet embedding;

decoding the denoised code snippet embedding using a pre-trained decoder having full self-attention and cross-attention with the code snippet embedding to generate a final predicted code snippet embedding;

projecting the final predicted code snippet embedding to discrete code tokens using a classification head that computes a probability distribution over code tokens and selects code tokens for a predicted code snippet in a target programming language based on the probability distribution; and returning the predicted code snippet to the user interface, wherein the memory further stores executable instructions that, when executed by the processor alone or in combination with other processors, cause the code generating system to perform functions of:

pre-training the denoiser and the decoder on training code snippets, the training code snippets being generated for pre-training using a continuous paragraph denoising technique in which noise is added to tokens in the training code snippets that correspond to keywords in the target programming language.

2. The code generating system of claim 1, wherein the pre-training further comprises:

training the denoiser to remove noise from the training code snippets to recover the keywords.

3. The code generating system of claim 1, wherein the functions further comprise:

pre-training the denoiser based on a loss function, the loss function including a first part which corresponds to an error between a predicted noise in a program embedding computed by the denoiser and actual noise in the program embedding, wherein the error between the predicted noise and the actual noise is minimized to train the denoiser.

4. The code generating system of claim 3, wherein the functions further comprise:

pre-training the decoder based on the loss function, the loss function including a second part which corresponds to an error between decoder output and the embedded ground truth code, and wherein the error is minimized to train the decoder.

5. The code generating system of claim 1, wherein the denoiser is a transformer block with full self-attention over the noisy code snippet embedding and cross attention between the noisy code snippet embedding and the code description embedding.

6. The code generating system of claim 1, wherein the encoder tokenizes the natural language prompt and transforms the tokenized natural language prompt to the code description embedding using an encoding function learned during pre-training.

7. The code generating system of claim 1, wherein:

the final predicted code snippet embedding corresponds to a sequence of hidden dimensions, and the full self-attention for the decoder enables the decoder to generate each hidden dimension with full information regarding each dimension in the sequence of hidden dimensions.

8. A method for generating code using a code generating system, the method comprising:

encoding using an encoder a natural language prompt to generate a code description embedding that embeds the natural language prompt into a continuous space;

iteratively denoising a noisy code snippet embedding conditioned on the code description embedding using a pre-trained denoiser to generate a denoised code snippet embedding;

decoding the denoised code snippet embedding using a pre-trained decoder having full self-attention and cross-attention with the code snippet embedding to generate a final predicted code snippet embedding;

projecting the final predicted code snippet embedding to discrete code tokens using a classification head that computes a probability distribution over code tokens and selects code tokens for a predicted code snippet in a target programming language based on the probability distribution;

returning the predicted code snippet to a user interface; and pre-training the denoiser and the decoder on training code snippets, the training code snippets being generated for pre-training using a continuous paragraph denoising technique in which noise is added to tokens in the training code snippets that correspond to keywords in the target programming language.

9. The method of claim 8, wherein the pre-training further comprises:

training the denoiser to remove noise from the training code snippets to recover the keywords.

10. The method of claim 8, further comprising:

pre-training the denoiser based on a loss function, the loss function including a first part which corresponds to an error between a predicted noise in a code snippet embedding computed by the denoiser and actual noise in the code snippet embedding, wherein the error between the predicted noise and the actual noise is minimized to train the denoiser.

11. The method of claim 10, further comprising:

pre-training the decoder based on the loss function, the loss function including a second part which corresponds to an error between decoder output and ground truth code, and wherein the error is minimized to train the decoder.

12. The method of claim 8, wherein the denoiser is a transformer block with cross attention between the noisy code snippet embedding and the code description embedding and full self-attention over the noisy code snippet embedding.

13. The method of claim 8, wherein the encoder tokenizes the natural language prompt and transforms the tokenized natural language prompt to the code description embedding using an encoding function learned during pre-training.

14. The method of claim 8, wherein:

the final predicted code snippet embedding corresponds to a sequence of hidden dimensions, and the full self-attention for the decoder enables the decoder to generate each hidden dimension with full information regarding other dimensions in the sequence of hidden dimensions.

15. A non-transitory computer readable medium on which are stored instructions that, when executed, cause a programmable device to perform functions of:

receiving a code description prompt which includes a natural language description of a code snippet for a code generating system to generate via a user interface;

encoding the natural language prompt to generate a code description embedding that embeds the natural language prompt into a continuous space using an encoder;

iteratively denoising a noisy code snippet embedding conditioned on the code description embedding using a pre-trained denoiser to generate a denoised code snippet embedding;

decoding the denoised code snippet embedding using a pre-trained decoder having full self-attention and cross-attention with the code snippet embedding to generate a final predicted code snippet embedding;

projecting the final predicted code snippet embedding to discrete code tokens using a classification head that computes a probability distribution over code tokens and selects code tokens for a predicted code snippet in a target programming language based on the probability distribution;

returning the predicted code snippet to the user interface; and pre-training the denoiser and the decoder on training code snippets, the training code snippets being generated for pre-training using a continuous paragraph denoising technique in which noise is added to tokens in the training code snippets that correspond to keywords in the target programming language.

16. The non-transitory computer readable medium of claim 15, wherein pre-training further comprises:

training the denoiser to remove noise from the training code snippets to recover the keywords.

17. The non-transitory computer readable medium of claim 15, wherein the functions further comprise:

pre-training the denoiser based on a loss function, the loss function including a first part which corresponds to an error between a predicted noise in a program embedding computed by the denoiser and actual noise in the program embedding, wherein the error between the predicted noise and the actual noise is minimized to train the denoiser.

* * * * *